United States Patent [19]
Münch et al.

[11] Patent Number: 5,921,050
[45] Date of Patent: Jul. 13, 1999

[54] DEVICE FOR FITTING A FRONT FRAME TO A HOUSING

[75] Inventors: Udo Münch, Sinn; Markus Neuhof, Ehringshausen-Niederlemp; Paul Root, Bad Endbach, all of Germany

[73] Assignee: Rittal-Werk Rudolf Loh GmbH & Co. KG, Herborn, Germany

[21] Appl. No.: 08/952,754

[22] PCT Filed: Jun. 21, 1996

[86] PCT No.: PCT/EP96/02696

§ 371 Date: Nov. 20, 1997

§ 102(e) Date: Nov. 20, 1997

[87] PCT Pub. No.: WO97/04270

PCT Pub. Date: Feb. 6, 1997

[30] Foreign Application Priority Data

Jul. 15, 1995 [DE] Germany ............................ 195 25 876

[51] Int. Cl.⁶ ........................................................ E06B 1/56
[52] U.S. Cl. .................... 52/656.1; 52/656.2; 52/656.9; 52/204.53; 52/211; 403/231; 403/402; 49/505
[58] Field of Search ................................ 52/656.1, 656.2, 52/656.9, 204.53, 211; 403/231, 402; 49/505, 504, DIG. 2

[56] References Cited

U.S. PATENT DOCUMENTS

| 4,325,204 | 4/1982 | Martin ................................ 49/504 X |
| 4,351,131 | 9/1982 | Kubik ...................................... 49/504 |
| 4,594,812 | 6/1986 | Clancy et al. .................... 49/504 X |
| 4,941,288 | 7/1990 | Morton .................................. 49/504 |
| 4,944,118 | 7/1990 | Biro ........................................ 49/504 |
| 4,958,259 | 9/1990 | Berg et al. . |

FOREIGN PATENT DOCUMENTS

| 3538188 | 10/1986 | Germany . |
| 4312850 | 10/1994 | Germany . |
| 1489278 | 10/1977 | United Kingdom . |

*Primary Examiner*—Carl D. Friedman
*Assistant Examiner*—Phi Dieu Tran A
*Attorney, Agent, or Firm*—Pauley Petersen Kinne & Fejer

[57] ABSTRACT

A device for fitting a front frame to an open front of a housing having wall components. The wall components and frame shanks of the front frame have mutually matching connecting components making it possible to connect the sections together simply and rapidly. Free corners are filled by specially shaped corner pieces to provide a closed front frame.

17 Claims, 2 Drawing Sheets

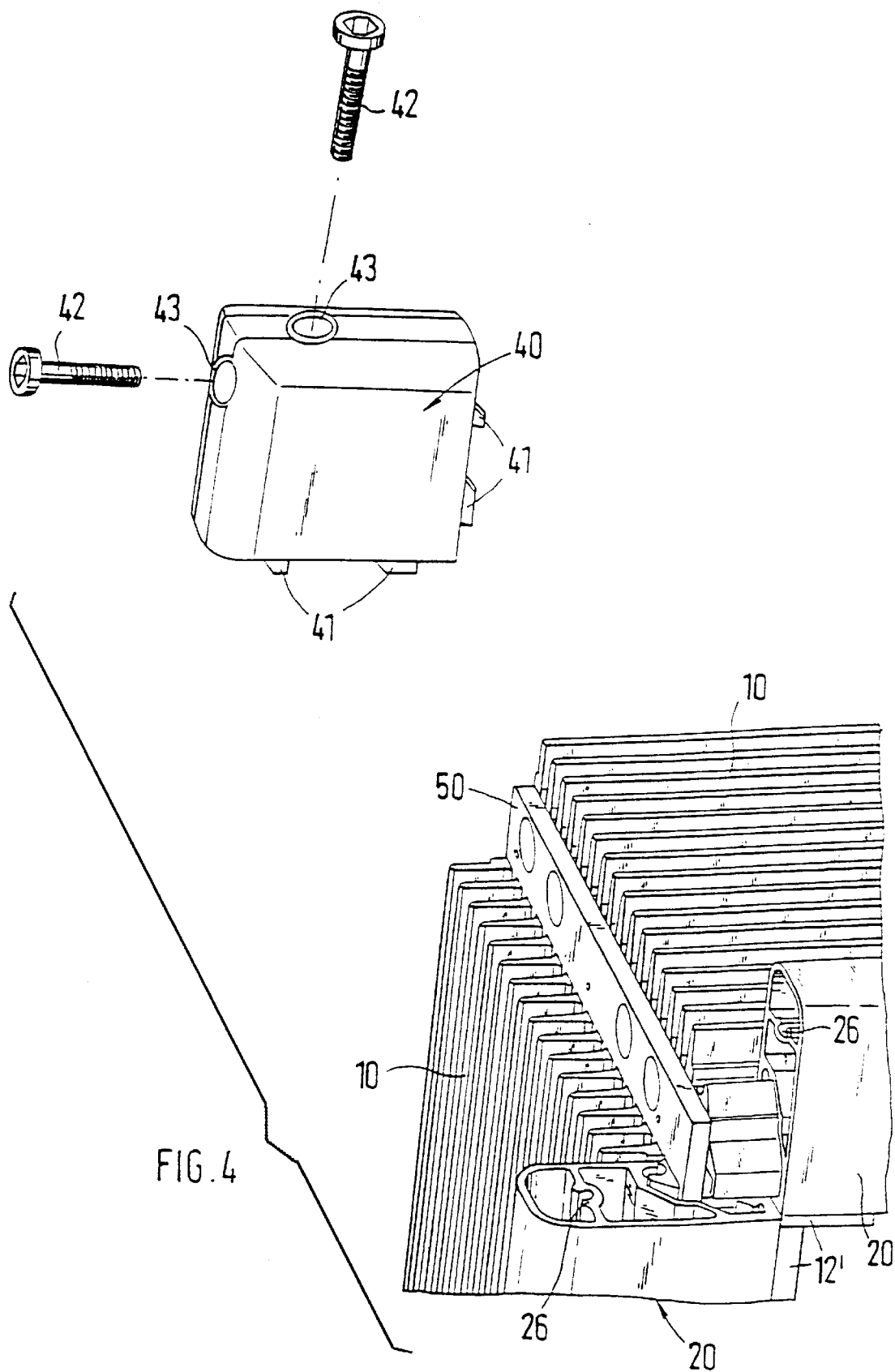

DEVICE FOR FITTING A FRONT FRAME TO A HOUSING

BACKGROUND OF THE INVENTION

1. Field of the Invention

This invention relates to a device for attaching a front frame to an open front of a housing having wall elements, wherein the wall elements in an area of the front have two wall sections placed vertically with respect to each other, one of which supports an open L-shaped strip.

2. Description of Prior Art

A conventional device is known from Great Britain Patent Reference 1 489 278. In this case one wall element has a plug connection, into which a plate can be inserted. The other wall element has two legs, which are spaced apart and parallel with respect to each other and have detent protrusions facing each other. Frame profiles of the front frame can be clipped into these detent protrusions. In this case the frame profile is held between the legs. A groove is between the frame profile and the leg on the front facing the viewer, which is distracting.

With known housings of this type, the front frames are bolted together with the front ends of the wall elements. This results in a considerable outlay of parts and assembly efforts and, in addition, the connection points are visible on the viewed side of the front frame.

SUMMARY OF THE INVENTION

It is one object of this invention to provide a device of the type mentioned at the outset, in which it is possible to quickly close off the open front of the housing with a front frame, wherein the connection points are not visible on the viewed side of the front frame.

This object is attained in accordance with this invention in that wall elements in the area of the front have two wall sections placed vertically with respect to each other, and a receiving groove inclined at 45° is formed in one wall section, while the other wall section has an open L-shaped strip facing away from the receiving groove. Frame legs of the front frame are suspended by a round seating strip in the L-shaped strips of the wall elements and are aligned with the receiving grooves of the wall elements by being pivoted in complementary shaped receiving grooves. Securing elements are inserted into the closed receptacles of the two receiving grooves of the wall element and the frame leg, which fix the frame legs on the wall elements, and corner pieces are bolted together with the frame legs, which have penetrating screw receptacles and are connected with the wall elements, and complete the front frame.

The frame legs of the front frame are suspended with their seating strips in the L-shaped strips of the wall elements, pivoted and secured on the wall elements of the housing by the securing elements. The corners are filled with the corner pieces, which are bolted together with the adjoining frame legs. In this case the fastening screws are aligned in the plane of the front, and therefore the viewed side of the front frame forms a closed surface.

In accordance with one embodiment, the distribution of the receiving grooves, the seating strip and the L-shaped strip can be such that the semicircular receiving groove of the wall element is formed in the wall section located in an area of the exterior of the wall element and is open in the direction toward the rear of the housing. The L-shaped strip is formed on the wall section of the wall element which is parallel with the front and is open toward the opening of the front panel.

However, the distribution can also have the semicircular receiving groove and the L-shaped strip interchanged and applied to the wall sections, wherein the L-shaped strip is open in the direction toward the rear of the housing and the receiving groove is open toward the opening of the front. In this case the two embodiments differ in the direction of pivoting of the frame legs for producing the assembly position.

In one preferred embodiment, in the front frame the frame legs are embodied as hollow profiled sections with two parallel walls, wherein one wall with the seating strip or the receiving groove at least partially covers the wall section which is parallel with the front, and wherein the other wall extends behind the receiving groove or the L-shaped strip as far as the exterior of the wall element.

The screw receptacle of the frame legs preferably has a longitudinal slit and is connected via strips with the two walls of the frame leg.

In accordance with one embodiment, the pivot seating of the frame leg on the wall element is designed in such a way that the round seating strip is connected via a connecting strip with the facing wall of the frame leg, wherein the connecting strip extends vertically with respect to the wall and bridges the L-shaped strip of the wall element.

The receiving groove in the frame leg is preferably designed in such one way that the semicircular receiving groove is formed on the end area of a one wall of the frame leg, extends at an angle of 45° with respect to the wall and is oriented with the open side toward an other parallel wall of the frame leg. For reasons of stability, the receiving groove of the one wall is connected via a strip with the other wall.

So that the front frame covers the housing on the open front, in one embodiment the frame legs cover beyond the exteriors of the wall elements upon assembly.

The application of the corner pieces is easier because on the two connecting sides extending vertically with respect to each other the corner pieces have fastening shoulders, which are inserted into hollow spaces embodied as hollow profiled sections, within each of the vertically situated frame legs.

So that, for example, a front panel, which upon installation encloses an area between the vertically situated frame legs, can be inserted into the front frame. In one embodiment the wall sections of the wall elements, which are aligned parallel with the open front all form a support strip, which has within it fastening receptacles or a fastening groove, inside the front frame allowing for attachment of the front panel.

BRIEF DESCRIPTION OF THE DRAWINGS

The invention will be explained in greater detail by means of an exemplary embodiment represented in the drawings wherein:

FIG. 4 is an exploded perspective view of a corner area of a housing with the frame legs fixed in place and with the corner piece, in an assembly position.

DESCRIPTION OF PREFERRED EMBODIMENTS

Figure 1:
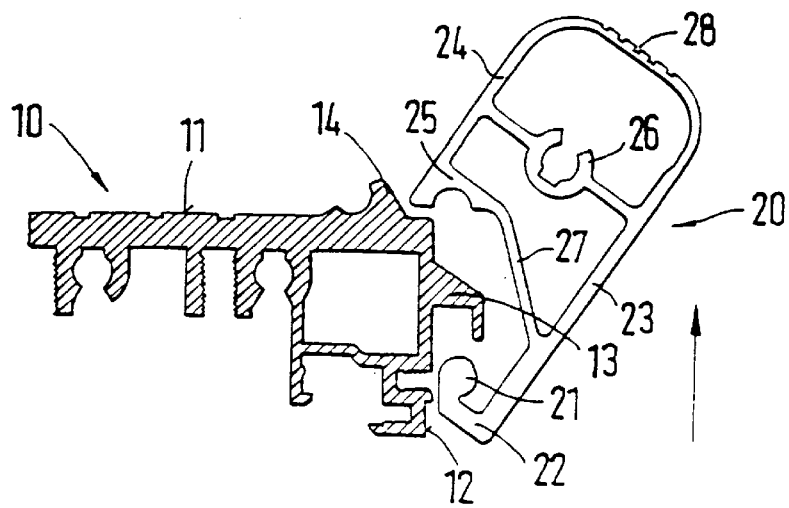
FIG. 1 is a partial sectional view, which shows a suspension of a frame leg of the front frame on a facing wall element.
Figure 2:
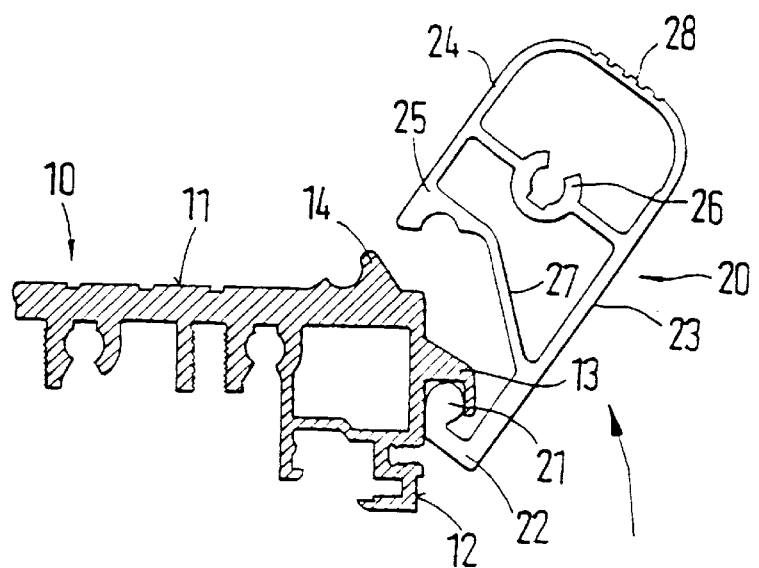
FIG. 2 is a partial sectional view of the suspended frame leg, as shown in FIG. 1, during pivoting.
Figure 3:
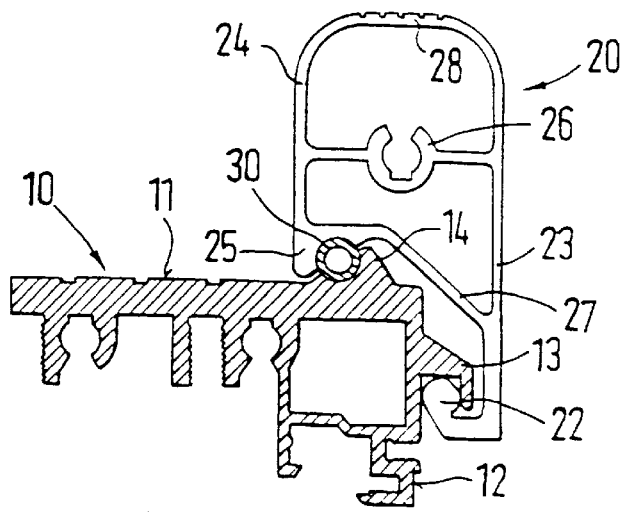
FIG. 3 is a partial sectional view, which shows the frame leg of FIG. 1 fastened by a securing element on the wall element.

The fastening of a frame leg 20 of a front frame on the open front of a housing comprising wall elements 10 is explained by means of FIGS. 1 to 3.

The wall element 10 has a wall section 11 located in an area of the exterior, and a wall section 12 parallel with the front. A semicircular receiving groove 14 is formed near the end of wall section 11. This receiving groove 14 is inclined by approximately 45° with respect to the wall section 11 and is open toward the rear of the wall element 10. A continuous L-shaped strip 13 is formed on an end portion of wall section 11. The continuous L-shaped strip 13 is inverted at 90 degrees relative to wall section 11. The formed-on receiving groove 14 and the formed-on L-shaped strip 13 both extending over all of wall section 11, are used for fixing a frame leg 20 in place, which is embodied as a hollow profiled section.

In accordance with one preferred embodiment, the distribution of the receiving grooves 14, the support strip 21 and the L-shaped strip 13 can be provided such, that the semicircular receiving groove 14 of the wall element 10 is formed in the wall section 12 located in the area of the exterior of the wall element 10.

The frame leg 20 has two parallel walls 23 and 24, which are connected with each other via a section 28. The wall 23 constitutes the viewed side of the front frame and has a support strip 21, round in cross section, on the lower end extending continuously over the length of the frame leg 20. The support strip 21 is connected via a connecting strip 22 with the lower end of the wall 23. The connecting strip 22 extends vertically with respect to the wall 23 and is of such a size that, when the support strip 21 is suspended in the L-shaped strip 13, it bridges the L-shaped strip 13 and the wall 23 can be placed vertically with respect to the wall section 11. The oppositely located wall 24 is shorter and has on a lower end a receiving groove 25 which is complementary to the receiving groove 14 of the wall element 10 and which also extends at an angle of 45° with respect to the wall 24. The receiving groove 25 is connected via a strip 27 with the wall 23. The wall 24 is of such size that, when frame leg 20 is placed vertically to wall section 11, its receiving groove 25 becomes aligned with the receiving groove 14 of the wall element 10 and forms a closed receptacle for a securing element 30.

As shown by FIG. 1, the support strip 21 of the frame leg 20 is inserted in an oblique position into the L-shaped strip 13 of the wall element 10, and a pivot seating of the frame leg 20 on the wall element 10 is obtained.

As shown by FIG. 2, the frame leg 20 then can be pivoted in the direction toward the wall element 10, until the receiver with the receiving groove 25 at the wall 24 becomes aligned with the receiving groove 14 in the wall section 11 of the wall element 10. Both receiving grooves 14 and 25 then form a receptacle, round in cross section, as shown in FIG. 3. A round securing element 30 is inserted into this receptacle. Then the frame leg 20 can no longer be pivoted away from the wall element 10 and is fixedly connected with the wall element 10. In this case the wall 24 of the frame leg 20 extends to the wall section 11 of the wall element 10.

A penetrating screw receptacle 26, having a longitudinal slit, is formed in approximately the center of the hollow frame leg 20 and is fastened by means of strips on the walls 23 and 24.

The receiving groove 14 and the L-shaped strip 13 can also be interchangeably formed out of the wall element 10. When attaching the frame leg 20 on the wall element 10, the oblique position and the pivot direction of the frame leg 20 change.

A housing corner is shown in a partial view in FIG. 4. The two wall elements 10, which are placed vertically with respect to each other, are connected with each other by means of a strip 50, which is formed of one piece with one of the wall elements 10. The front edges of the two wall elements 10 each have a frame leg 20. The front frame is completed with a corner piece 40. The cross section of the corner piece 40 is matched to the cross section of the frame legs 20, so that the corner piece 40 can be attached to the fronts of the frame legs 20, which are placed vertically with respect to each other.

Attachment takes place diagonally, wherein centering shoulders 41 of both sides of the corner piece 40 are inserted into hollow spaces of the frame legs 20. In the process the corner piece 40 is positioned in such a way that the fastening screws 42, which are inserted and are held in threaded sleeves 43, can be screwed into the screw receptacles 26 of the frame legs 20. All four corners are filled with such corner pieces, so that a closed front frame without visible fastening points on the viewed side is created.

In the exemplary embodiment the wall section 12 of the wall elements 10 facing the opening in the front projects past the front frame and forms an encircling support strip 12', as shown in FIG. 4. The support strip 12' can be used as a fastening location for a door or a front panel.

We claim:

1. A front frame attaching to a housing having wall elements, wherein the wall elements of the open front have two wall sections placed vertically with respect to each other, and wherein one of the wall sections supports an open L-shaped strip, the device comprising:

one wall section (11) of the wall sections having a receiving groove (14) inclined at 45°;

the other wall section (12) of the wall sections having an open L-shaped strip (13) facing away from the receiving groove (14);

a plurality of frame legs (20) having a round support strip (21) suspended in the L-shaped strips (13) of the wall elements (10) and aligned with the receiving grooves (14) of the wall elements (10) by being pivoted within correspondingly shaped receiving grooves (25);

a plurality of securing elements (30) inserted into closed receptacles of the two receiving grooves (14, 25) of the wall element (10) and the frame leg (20), which fix the frame legs (20) on the wall elements (10); and a plurality of corner pieces (40) having penetrating screw receptacles (26) at the front and are bolted together with the wall elements (10) connected with the frame legs (20) to complete the front frame.

2. In the front frame in accordance with claim 1, wherein the receiving groove (14) of the wall element (10) is formed in the wall section (11) located in the area of the exterior of the wall element (10) and is open in a direction toward a rear of the housing; and the L-shaped strip (13) is formed on the wall section (12) of the wall element (10) which is parallel with a front of the housing and is open toward the opening of the front of the housing.

3. In the front frame in accordance with claim 2, wherein the receiving groove (14) and the L-shaped strip (13) are interchanged and applied to the wall sections (11, 12), wherein the L-shaped strip (13) is open in the direction toward the rear of the housing and the receiving groove (14) is open toward the opening of the front of the housing.

4. In the front frame in accordance with claim 3, wherein the frame legs (20) are embodied as hollow profiled sections with two parallel walls (23, 24), wherein one wall (23) of the walls (23, 24) with one of the support strip (21) and the receiving groove (14) at least partially covers the wall section (12) which is parallel with the front of the housing and wherein the other wall (24) of the walls (23, 24) extends behind one of the receiving groove (14) and the L-shaped strip (13) as far as the exterior of the wall element (10).

5. In the front frame in accordance with claim 4, wherein the screw receptacle (26) has a longitudinal slit and is connected by strips with the two walls (23, 24) of the frame leg (20).

6. In the front frame in accordance with claim 5, wherein the support strip (21) is connected via a connecting strip (22) with the facing wall (23) of the frame leg (20), wherein the connecting strip (22) extends vertically with respect to the wall (23) and bridges the L-shaped strip (13) of the wall element (10).

7. In the front frame in accordance with claim 6, wherein the semicircular receiving groove (25) is formed on an end area of the wall of the frame leg (20), extends at an angle of 45° with respect to the wall (24) and is oriented with the open side toward the other parallel wall (23) of the frame leg (20).

8. In the front frame in accordance with claim 7, wherein the receiving groove (25) of the one wall (24) is connected by a strip (27) with the other wall (23).

9. In the front frame in accordance with claim 8, wherein the frame legs (20) protrude past exteriors of the wall elements (10).

10. In the front frame in accordance with claims 9, wherein on two connecting sides extending vertically with respect to each other the corner pieces (40) have fastening shoulders (41) which are inserted into hollow spaces embodied as hollow profiled sections of the frame legs (10) of one corner of the front frame.

11. In the front frame in accordance with claim 1, wherein the frame legs (20) are embodied as hollow profiled sections with two parallel walls (23, 24), wherein one wall (23) of a plurality of walls (23, 24) with one of the support strip (21) and the receiving groove (14) at least partially covers the wall section (12) which is parallel with the front of the housing and wherein another wall (24) of the walls (23, 24) extends behind one of the receiving groove (14) and the L-shaped strip (13) as far as the exterior of the wall element (10).

12. In the front frame in accordance with claim 1, wherein a screw receptacle (26) has a longitudinal slit and is connected by strips with two walls (23, 24) of the frame leg (20).

13. In the front frame in accordance with claim 1, wherein the support strip (21) is connected via a connecting strip (22) with a facing wall (23) of the frame leg (20), wherein the connecting strip (22) extends vertically with respect to the wall (23) and bridges the L-shaped strip (13) of the wall element (10).

14. In the front frame in accordance with claim 1, wherein a semicircular receiving groove (25) is formed on an end area of one wall of the frame leg (20), extends at an angle of 45° with respect to another wall (24) and is oriented with the open side toward the other parallel wall (23) of the frame leg (20).

15. In the front frame in accordance with claim 14, wherein the semicircular receiving groove (25) of the one wall (24) is connected by a strip (27) with the other wall (23).

16. In the front frame in accordance with claim 1, wherein the frame legs (20) protrude past exteriors of the wall elements (10).

17. In the front frame in accordance with claim 1, wherein on two connecting sides extending vertically with respect to each other the corner pieces (40) have fastening shoulders (41) which are inserted into hollow spaces embodied as hollow profiled sections of the frame legs (20) of one corner of the front frame.

* * * * *